United States Patent [19]

Kurtz

[11] Patent Number: 5,749,653
[45] Date of Patent: May 12, 1998

[54] CONTINUOUS SQUEEZE FLOW MIXING PROCESS

[75] Inventor: Stuart Jacob Kurtz, Martinsville, N.J.

[73] Assignee: Union Carbide Chemicals & Plastics Technology Corporation, Danbury, Conn.

[21] Appl. No.: 822,507

[22] Filed: Mar. 24, 1997

Related U.S. Application Data

[63] Continuation-in-part of Ser. No. 623,190, Mar. 28, 1996.

[51] Int. Cl.$^6$ ........................................... B01F 11/00
[52] U.S. Cl. ............................ 366/256; 366/257; 366/332
[58] Field of Search ............................ 366/255, 256, 366/257, 258, 259, 260, 262, 267, 268, 277, 315, 316, 342, 332, 348

[56] References Cited

U.S. PATENT DOCUMENTS

| | | | |
|---|---|---|---|
| 140,445 | 7/1873 | Thompson | 366/259 |
| 2,667,407 | 1/1954 | Fenske et al. | 366/332 |
| 2,828,111 | 3/1958 | Messinger et al. | 366/332 |
| 3,380,116 | 4/1968 | Cox et al. | |
| 3,458,894 | 8/1969 | Wheeler | |
| 3,550,201 | 12/1970 | Chapman | |
| 3,589,685 | 6/1971 | Gradishar | 366/260 |
| 3,613,160 | 10/1971 | Loomans et al. | |
| 3,666,386 | 5/1972 | McElroy et al. | |
| 4,334,783 | 6/1982 | Suzaka | |
| 4,452,750 | 6/1984 | Handwerk et al. | |
| 4,714,350 | 12/1987 | Nortey | |
| 4,744,668 | 5/1988 | Nortey | |
| 4,913,197 | 4/1990 | Friedrich | 366/332 |
| 5,327,816 | 7/1994 | DuPont et al. | 366/342 |
| 5,458,474 | 10/1995 | Neubauer | |

FOREIGN PATENT DOCUMENTS

| | | | |
|---|---|---|---|
| 15663 | of 1889 | United Kingdom | 366/256 |

*Primary Examiner*—Tony G. Soohoo
*Attorney, Agent, or Firm*—S. H. Hegedus

[57] ABSTRACT

A continuous mixing process is discloses that provides improved dispersive mixing over conventional mixing processes Viscoelastic material is introduced and withdrawn at a constant rate into and out of a housing having a central shaft whereby the shaft has at least one plate extending perpendicularly from the shaft. A drive means is actuated to reciprocate the plate along the axis of the shaft in order to provide a squeezing of material between the plate and the end walls of the housing, or between the plate and annular partitions disposed within the housing. The process employs a squeeze flow motion around the parallel surfaces at a Hencky strain greater than 2 and at a rate corresponding to a Deborah Number greater than 10.

11 Claims, 4 Drawing Sheets

CONTINUOUS SQUEEZE FLOW MIXING PROCESS

This application is a continuation-in-part of U.S. application Ser. No. 08/623,190, filed Mar. 28, 1996.

FIELD OF THE INVENTION

This invention relates to a continuous, energy efficient process for dispersively mixing viscoelastic materials, such as polymers.

BACKGROUND OF THE INVENTION

As used herein, dispersive mixing refers to the breakup and reduction in size of regions of inhomogeneity, such as gels, agglomerates, or regions of high viscosity and low molecular diffusivity, within a matrix of another material. During dispersive mixing, stresses must be applied to the surfaces of the regions of inhomogeneity in order to break them up. Dispersive mixing may involve miscible or immiscible systems, and even in a system where the components are thermodynamically miscible with one another, dispersive mixing may be required from the viewpoint of kinetics if the time scale to distribute molecularly one component in the other is very long. Dispersive mixing is advantageous in that it results in smaller particles or regions of one material in a matrix of another material, generating more surface area for interfacial bonding and better homogeneity, which often gives rise to improved physical and/or processing properties in the overall material. The dispersive mixing process is carried out until the particles or regions are sufficiently small so that any further breakup leads to little effective change in properties of the system.

Other terms for mixing are employed. Two such terms are distributive mixing and blending. Distributive mixing is the rearrangement of the relative positions of phases or regions without significant change in their sizes. Often it is important to have good distributive mixing for the improvement of appearance and other physical properties of a mixed material.

Blending involves both the break up of inhomogeneous regions by dispersive mixing and position rearrangement by distributive mixing. In an important sense, blending may be thought of as combining a change in size process with a distribution process. However, when blending two or more components of the same viscosity that are thermodynamically identical, changes in the sizes of regions of inhomogeneity readily take place so that consideration of stresses at the interface between the different components is not required.

Of particular interest to the polymer industry is the dispersive mixing of a high molecular weight polymer in a lower molecular weight polymer matrix. Bimodal molecular weight distribution polymer products are often made this way. In this case, the components being mixed are of the same basic chemical type and successful dispersive mixing can result in improved melt strength, giving rise to improved processing characteristics. However, dispersive mixing of such materials is especially difficult because it is difficult to transmit stresses to a high viscosity minor phase through a surrounding matrix of low viscosity material. Known mixing processes possess only limited ability to accomplish this.

It is believed by those skilled in the art that with viscoelastic materials, high deformation rates relative to the relaxation time of the minor phase and the matrix will allow more effective transmission of stress to the minor phase. Applicant also believes that at a high deformation rate, the minor phase is more likely to fail at lower strains and thus disperse more effectively. The measure of the relaxation time of the material relative to the time scale of the deformation is known in rheology as the Deborah Number (*Principles of Polymer Processing*, by Z. Tadmor and C. Gogos, John Wiley and Sons, 1979). For extensional deformations, the Deborah Number is given by the formula: $\lambda/(L/(v2-v1))$, wherein $\lambda$ is the effective relaxation time of the material, L is the length over which the material is deformed, and (v2-v1) is the change in the velocity of the material as it is deformed.

While the relative rate of deformation (i.e. the Deborah Number) is important for optimizing a dispersive mixing process, so too is the total deformation of the material, since the failure of regions under deformation usually requires that a minimum deformation be exceeded. A measure of the amount of deformation in extensional flow is known as the Hencky Strain measure. A description of the Hencky Strain can be found in the text *Rheology, Principles, Measurements, and Applications* by C. W. Macosko (VCH, 1994). The formal definition of Hencky Strain is the natural logarithm of the final length of the sample divided by the initial length. For purposes of the present invention, an approximation of Hencky strain is used: the natural log of the area of the flow entering a convergent geometry divided by the smallest area of the geometry for a substantially extensional flow field.

A majority of mixing processes known in the art, such as those done with batch mixers made by Banbury and Steward-Bolling, continuous mixers such as the twin screw mixers of Welding Engineers and Werner & Pfleiderer, and the intensive continuous mixers of Farrell Corporation (FCM) and Kobe Steel (LCM), employ the rotating action of a screw or rotors as the major energy input to the system to mix materials. Because of such rotating action, these processes subject materials to a high level of shear flows compared to extensional flows. The high levels of shear flows in these processes have two results. First, such processes are relatively energy inefficient in that shear flows contribute to significant energy dissipation and rapid heat rise in the system being mixed, thus often limiting the amount of mixing that is possible without degrading the material. See for example, L. Erwin, "Principles of Laminar Fluid/Fluid Mixing," *Mixing in Polymer Processing*, C. Rauwendaal, ed. (Marcel Dekker, Inc., 1991), in which it is noted that mixing processes that rely on simple shear flow require several orders of magnitude more energy than those that rely on extensional flow to achieve the same level of mixing. Second, the dispersive mixing capability based on the shear flow component of these mixing processes is poor. It is known that extensional flows, on the other hand, are much better at breaking up inhomogeneities in a material than shear flows and are therefore much better at dispersive mixing. It is the extensional flow capabilities of rotation-type mixing devices that contribute most effectively to the limited success of these devices as dispersive mixers.

For example, U.S. Pat. No. 4,417,350 describes the use of non-intermeshing two-wing rotors for use in high intensity, batch mixing machines. These rotors rotate side-by-side within the mixing machine. Although the patent states in the abstract, "[b]y virtue of driving the rotors at synchronous speed with the phase angle relationship of about 180°, a powerful squeeze-flow mixing action and advantageous pull-down effect on the materials being mixed is produced twice during each cycle of rotation," in fact such rotors intermittently expose the materials being mixed to only a brief extensional stretch while imposing a high level of shear. The squeeze flow action is only incidental to the roll mill-type action of the rotors. Squeeze flow imparts a positive displacement to material between surfaces that approach one another, whereas the rotors in the above mentioned application drag the material through a gap.

U.S. Pat. No. 3,458,894 discloses a mixer comprising a barrel that is lined with a number of detachable plates. The mixer contains a mixer blade assembly having interrupted helical vanes or flights cast on sleeves that are mounted on a shaft. The shaft moves in both reciprocative and rotating directions. Bolts project as lugs into the mixing chamber in the area of the vane interruptions, such that the interrupted vanes clear the lugs during the rotational and reciprocative movement in a type of weaving pattern. Because the interrupted vanes clear the lugs during the rotational and reciprocative movement, very little squeeze flow, though some limited stretching flow, takes place with this apparatus. This device has been analyzed in "Modeling of the Cokneader," by Pierre H. M. Elemans, Chapter 12, *Mixing and Compounding of Polymers—Theory and Practice*, I. Manas-Zloczower and Z. Tadmor, eds. (Hanser/Gardner, 1994). Elemans notes that the "weaving pattern gives the cokneader an excellent distributive mixing quality." However, it lacks an excellent dispersive mixing capacity. And due to the rotational movement of the shaft and the vanes thereon, this assembly subjects the materials it mixes to a high degree of shear compared to extension.

Although such conventional, rotating-type mixing devices typically mix materials at reasonable Deborah Numbers, i.e., greater than about 10, the amount of extensional stretching relative to shear deformations that can be achieved in such devices is low. A key problem facing those intent on improving continuous mixing processes is how to achieve the combination of high stretching rates (Deborah Number) and high stretching (Hencky Strains) simultaneously in an energy efficient process.

Mixing processes employing squeeze flow are also known. For example, U.S. Pat. No. 2,828,111 discloses a plunger mixer or reactor comprising a closed cylindrical body member provided with spaced discs held in a fixed position with relation to each other and a plunger arranged to reciprocate through aligned holes in the discs, the plunger also carrying discs fixed in space relation thereon. The discs on the plunger and the discs in the body member are alternately arranged, and the plunger is adapted to move longitudinally in the cylindrical body. The device also comprises an openings through which material may be fed into and discharged from the body member.

This device is designed to provide a low degree of mixing as seen in the example where the holes constitute more than 20% of the total cross section area. This provides a Hencky strain of less than 2 under any condition of motion. The rate of reciprocating motion is 2 strokes per minute over a few inches, providing a Deborah number that appears to be much less than 10 under the conditions described for the use of this device.

Applicant has discovered that excellent dispersive mixing occurs when a viscoelastic material is subjected to primarily extensional flows at a high Hencky strain and a high Deborah Number in a reciprocating, squeeze flow device affording passes through narrow passages. In addition, preferably, more than 50% of the viscoelastic material is also subjected to a shear stress of at least about 35 psi in the device, thereby making the material susceptible to slip within the device. In contrast with known rotating-type mixing devices, in which slip of the material along the walls of the device is to be avoided, slip is beneficial in the present process. For flow through passages, the existence of slip along the wall shifts much of the wasted shear flow energy dissipation towards more energy efficient input into extensional flow deformation.

That the combination of squeeze flow, a Hencky strain greater than 2, and a mixing rate corresponding to a Deborah Number greater than 10 results in optimum dispersive mixing of viscoelastic material has gone until now unrecognized.

SUMMARY OF THE INVENTION

The invention provides a continuous, energy efficient process for dispersively mixing a viscoelastic material, which comprises:
  i) introducing the material at a substantially constant rate into a single stage mixing device comprising:
    a) a housing having an axis, an inner surface, two end walls, an inlet, and an outlet;
    b) a central shaft located parallel to or on the axis of the housing that is reciprocatively movable parallel to or along the axis of the housing, said central shaft comprising a plate extending substantially perpendicularly therefrom, wherein the plate does not touch the inner surface of the housing; and
    c) drive means operatively attached to said central shaft for moving the central shaft through the housing in a reciprocating fashion;
  ii) squeezing the material between the plate and the end walls of the housing at a Hencky strain greater than 2 and at a rate corresponding to a Deborah Number greater than 10; and
  iii) withdrawing the material from the device at a substantially constant rate.

The invention also provides a continuous, energy efficient process for dispersively mixing a viscoelastic material, which comprises:
  i) introducing the material at a substantially constant rate into a multi-stage mixing device comprising:
    a) a housing having an axis, an inner surface, two end walls, an inlet, and an outlet;
    b) at least one partition attached substantially perpendicularly to the inner surface of the housing;
    c) a central shaft located parallel to or on the axis of the housing that is reciprocatively movable parallel to or along the axis of the housing, said central shaft comprising at least two plates extending substantially perpendicularly therefrom, wherein the partition does not touch the central shaft, the plates do not touch the inner surface of the housing, and the partition and the plates are substantially parallel; and
    d) drive means operatively attached to said central shaft for moving the central shaft through the housing in a reciprocating fashion;
  ii) squeezing the material between the plates and the end walls and between the partition and the plates at a Hencky strain greater than 2 and at a rate corresponding to a Deborah Number greater than 10; and
  iii) withdrawing the material from the device at a substantially constant rate.

DETAILED DESCRIPTION OF THE INVENTION

Figure 1:
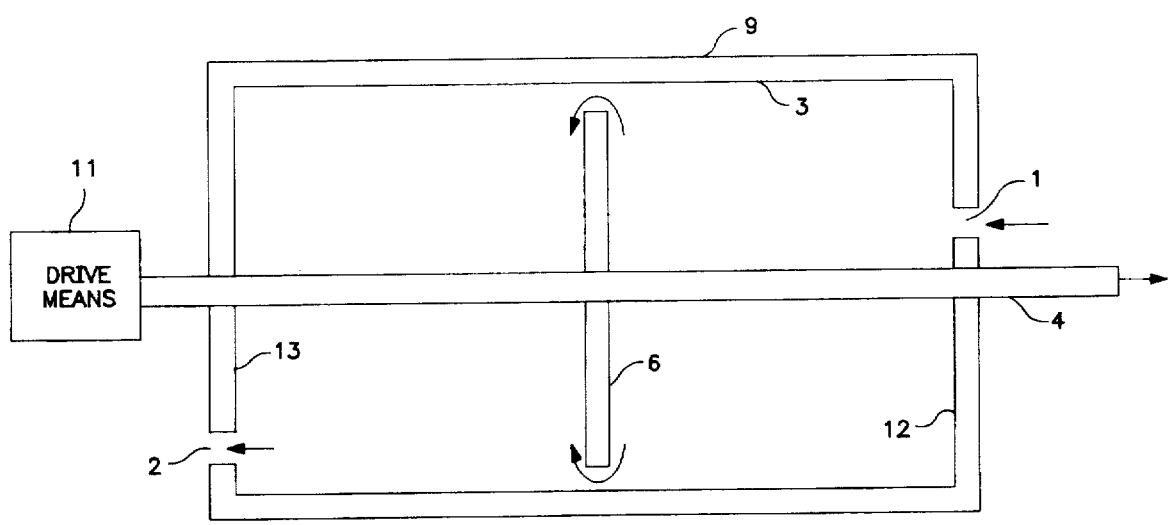
FIG. 1 is a schematic view, partly in section, of a single stage mixing device that may be used in the invention.

Any type of flowable, viscoelastic material may be mixed using the process of the invention. Solids, liquids, gases, or combinations thereof may be mixed, provided the overall mixture is flowable. Examples of such materials are polymers, pharmaceuticals, foodstuffs, cements, inks, paints, solutions, suspensions, pastes, blends, and multiphase materials. The invention is particularly useful for mixing highly viscous liquids, such as molten polymers, or mixing viscous liquids with solids—for example mixing a molten polymer with a solid additive or filler material.

According to the invention, viscoelastic material is dispersively mixed by introducing the material at a substantially constant rate into a mixing device comprising a housing containing substantially parallel surfaces, subjecting the material to extensional deformation by squeezing the material between the parallel surfaces at a Hencky strain greater than 2 and at a rate corresponding to a Deborah Number greater than 10, such that the material flows around the parallel surfaces, and withdrawing the material from the mixing device at a substantially constant rate. This process produces sufficient extensional flows to obtain effective dispersive mixing, while keeping the rate of energy input (power) to a minimum. This is advantageous since essentially all the mechanical work done is converted into heat, which is useful in melting but may be harmful in degrading the material. An efficient mixing process will channel as much of the mechanical energy to those deformation processes that assist in dispersive mixing rather than generate excess heat, i.e., extensional flows.

The mixing device may be either single stage or multi-stage. It comprises a housing having an axis, an inner surface, two end walls, an inlet, and an outlet. The viscoelastic material is fed in a fluid-like form to the inlet of the mixing device using any conventional conveyor of flowable materials, such as a screw extruder or melt pump. Advantageously, the flow rate of the viscoelastic material through the device is, on average, completely independent of any motions of the components of the mixing device. The inlet and outlet may be placed at any desired positions in the housing. In a single stage or multi-stage mixing device, it is preferred to locate the inlet at one end of the housing and the outlet at the opposite end of the housing. In a multi-stage mixing device, it is also possible to have one inlet in the center of the housing and an outlet at each end of the housing, or the reverse with inlets at each end of the housing and an outlet at the center. Such a single inlet/dual outlet or dual inlet/single outlet configuration allows the material to flow through the mixing device in a symmetric manner, also exposing all of the material to the same stress history.

The housing may be of any axially symmetrical shape; however, it is preferred to use a housing of cylindrical shape.

Located within the housing is a central shaft parallel to or on the axis of the housing. Extending substantially perpendicularly from the central shaft are plates. In a single stage apparatus, the mixing device contains one plate. In a multi-stage device, the mixing device contains at least two plates and at least one partition, the partition being attached to the inner surface of the housing. The partition is substantially perpendicular to the inner surface of the housing and is substantially parallel to the plates.

The partitions extend from the inner surface of the housing to a point near but not touching the central shaft. The clearance between the partitions and the central shaft may be adjusted as desired. Similarly, the plates do not touch the housing. The plates extend from the central shaft to point near the inner surface of the housing, and the clearance between the plates and the inner surface of the housing may also be adjusted as desired. The partitions and plates may be any shape; preferably they are both disc-shaped.

FIG. 1 is a schematic view of a single stage mixing device that may be used in the process of the invention. Operation of a single stage mixing device is as follows. Flowable material is introduced into the housing 9 through the inlet 1. The material is there subjected to a squeezing motion between plate 6 and one end wall 12 of the housing, which results from movement of the central shaft 4 along the axis of the housing, which in turn is powered by the drive means 11. Because of the clearance between the plate and the inner surface 3 of the housing, a portion of the squeezed material moves through the space between the plate and the inner surface of the housing in an extensional stretching manner contributing to a substantial dispersive mixing action. Arrows in the Figures indicate the direction of flow of viscoelastic material and the central shaft.

Next, the central shaft moves in the opposite direction, thereby squeezing the partially mixed material between the plate and the other end wall 13 of the housing, further mixing the material and causing additional flow over the plate and further dispersive mixing. As the central shaft is moved back and forth in the housing, the plate moves back and forth as well. The mixed material, the product, exits the housing though an outlet 2.

After the mixed product exits the mixing device, it may be directed to a die or other device known in the art to form, pelletize, or otherwise alter the mixed product, as desired.

The central shaft on which the plate is located moves in a reciprocating fashion via a drive means 11, which may be any conventional means for displacing the central shaft in a back-and-forth motion, such as a piston. The central shaft is not required to rotate. The force supplied by the drive means may be set as desired, depending on whether the material to be mixed is "hard" or "soft." The drive means is preferably a hydraulic piston or an apparatus that operates in a defined motion manner as can be accomplished by the translation of rotational motion into reciprocating motion. The amplitude of the motion, the frequency of the motion, and any pauses in the motion can be independently set and should correspond to the amount of work to be imposed on the viscoelastic material.

In a preferred embodiment of the invention, the mixing device is a staged mixing device, which comprises one or more partitions and two or more plates (both of which may be spaced evenly or unevenly within the housing) such that the partitions and the plates form a series of alternating, parallel surfaces within the housing. This in turn defines multiple mixing cells within the housing. Each mixing cell is bounded by two partitions or a partition and an end wall of the housing, with a moving plate in between.

Figure 2:
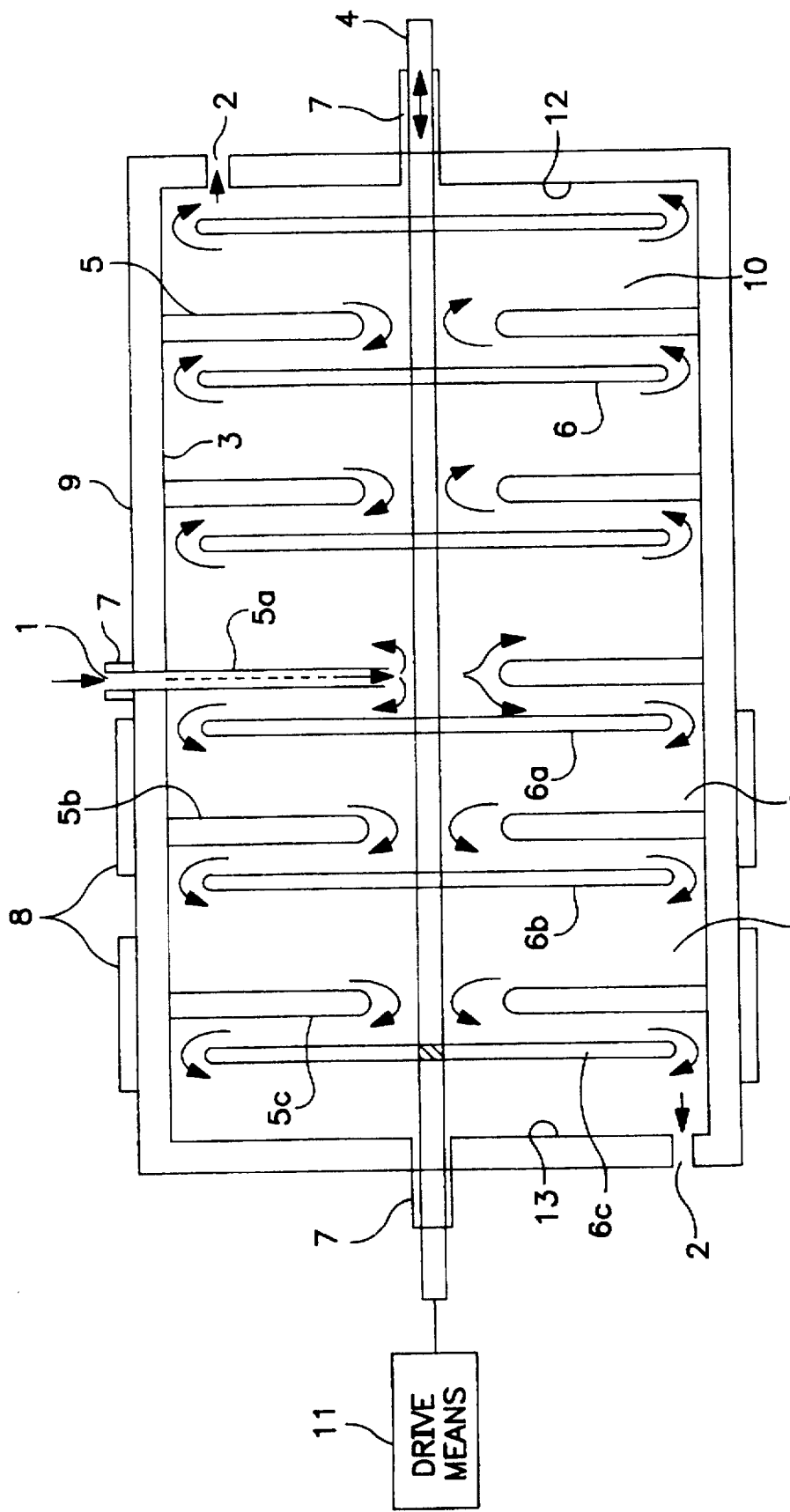
FIG. 2 is a schematic view, partly in section, of a multi-stage mixing device that may be used in the invention.

FIG. 2 is a schematic view of a staged mixing device that may be used in the process of the invention. Flowable material is introduced into the housing 9 through the inlet 1, which connects to the interior of the housing through a hole in a first partition 5a. The material enters a first mixing cell 10a and is there subjected to a squeezing motion between the first partition 5a and a first plate 6a, which results from movement of the central shaft 4 along the axis of the housing, which in turn is powered by the drive means 11. Because of the clearance between the first plate and the inner surface 3 of the housing, a portion of the squeezed material, which is now partially mixed, moves through the space between the first plate and the inner surface of the housing in an extensional stretching manner contributing to a substantial dispersive mixing action.

Next, while the partially mixed material is still in the first mixing cell, the central shaft moves in the opposite direction, thereby squeezing the partially mixed material between the first plate 6a and a second partition 5b, further mixing the material and causing additional flow over the plate and further dispersive mixing. A portion of the further mixed material then passes through the space between the central shaft and the second partition into a second mixing cell 10b. While the central shaft is moving back and forth in the housing, a portion of the mixed material from one mixing cell 10 is transferred to the next mixing cell. The overall rate of flow through the device is controlled externally by the source of the material. The number, amplitude, and path of the reciprocating motion is independently controlled through the power source acting on the central shaft. Eventually, the fully mixed material, the product, exits the housing though an outlet 2.

As shown in FIG. 2, the mixing device may optionally have seals 7 where the central shaft enters and emerges from the housing. In addition the mixing device may also optionally comprise temperature control bands 8 along the outside of the housing. Such temperature control bands may be, for example, electrically heated or oil heated.

A staged mixing device may be particularly useful when mixing two components that are not easily homogenized. With such materials it may be also be desirable to add one material slowly to the other, i.e., by adding one of the materials in a series of small doses to the other. This can be accomplished with the staged mixing device above having separate inlets into each of the mixing cells. This allows one to introduce small quantities of one material into another gradually. One example of mixing that may be accomplished via multiple additions is the introduction of moderate quantities of a low molecular weight molten polymer to a matrix of a high molecular weight molten polymer in a series of steps, such that after several such additions, the low molecular weight polymer is the major component. The mixture resulting from this process is homogeneous, whereas if the same total amount of low molecular weight polymer were added in a single step to the high molecular weight polymer, or vice-versa, the combination would, in general, be too difficult to mix homogeneously.

Figure 5:
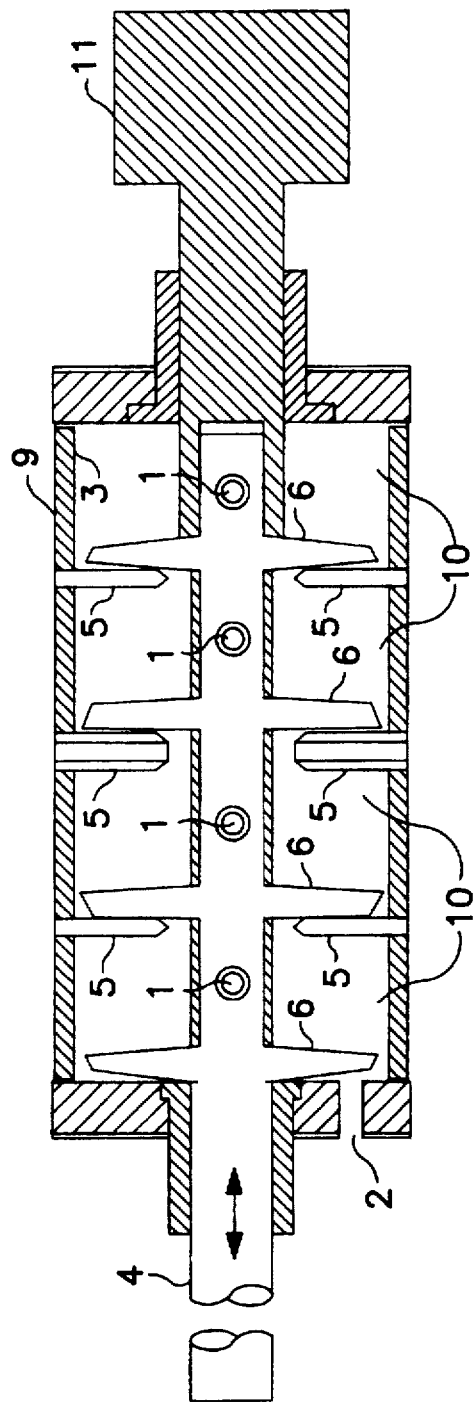
FIG. 5 is a schematic view, partly in section, of a multi-cell mixing device containing multiple inlets that may be used in the invention.

FIG. 5 is a schematic view of a staged mixing device having multiple inlets. Flowable material is introduced into the housing 9 through the inlets 1, which are located in the central shaft 4 and connect to the interior of the housing. A portion of material enters into each mixing cell 10 and is there subjected to a squeezing motion between the partitions 5 and the plates 6, which results from movement of the central shaft 4 along the axis of the housing, which in turn is powered by the drive means 11.

Separate inlets into each cell of a multi-stage mixing device allows for a variety of other complex blending processes requiring sequential addition of materials. In this embodiment of the invention, each cell operates as an efficient mixing device, thus the material added to each cell can be well mixed before proceeding to the next cell. For example, a modifier that must be dispersed in a polymer before other agents, so as to minimize possible direct interactions, may be sequentially added to the polymer in separate inlets. Each of the cells may be used as part of a reactive extrusion process. In this case, different chemically active ingredients may be added at any of the cells appropriate to the reaction path needed. Multiple inlets may also be useful for the blending of a polymer with additives. Such additives can be mixed into the polymer in small, sequential doses. Yet another application is for the addition of additives that are stable only for short residence times. Such additives may be added close to or in the last cell and still exit the system in much less time than the full residence time of the device.

In another embodiment of the invention, at least one plate or partition comprises a filter. The filter may be sandwiched between two support plates such as breaker plates having multiple holes or openings. This enables the separation of undesirable particles from the material being mixed. The volume containing the undesirable particles may be separately purged. In addition, the filters should be removable, so that they may be cleaned and replaced as needed, though the inherent action of the reciprocating motion provides a self cleaning action for the filters. Squeeze flow motion in the presence of filters takes advantage of the positive displacement of materials between plates and partitions or end walls of the housing. And because of the reciprocating motion of the device, the number of passes of material through the filter is multiplied. Since the reciprocating motion causes a back flow through the filter, it is possible to keep accumulated, trapped material from clogging the filter. Thus an automatic self cleaning filter results.

Figure 3:
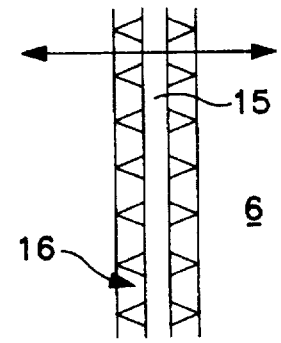
FIG. 3 is a partial side view of a plate comprising a filter.

FIG. 3 shows a partial side view of a plate 6 comprising a filter 15 sandwiched between two breaker plates 16.

In further embodiment of the invention, at least one plate or partition comprises one or more holes. Such holes may be in any number and shape. The placement of holes in the plates or partitions leads to a type of folding process for the material being mixed, which significantly improves the distributive mixing capability of the mixing device. Alternately, the holes may comprise one way valves, thus further improving the mixing process by interrupting the main flow periodically.

Figure 4A:
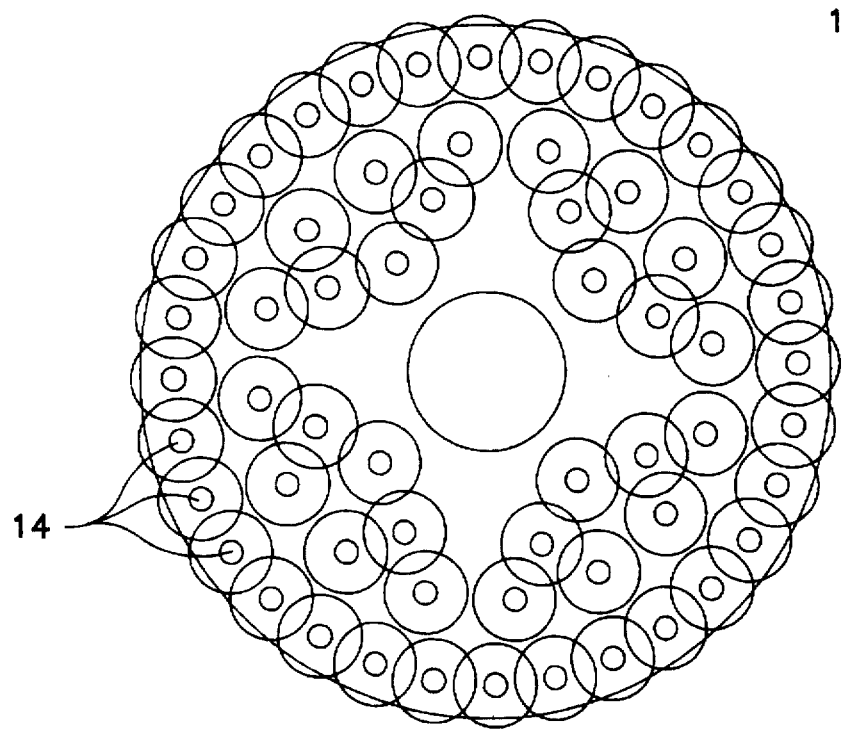
FIG. 4a is a front view of a plate comprising holes.
Figure 4B:
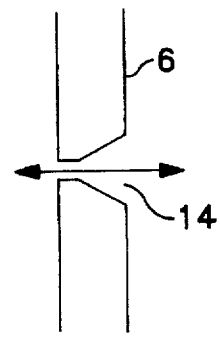
FIG. 4b is a partial side view of a plate comprising a hole.

FIG. 4a shows a front view of a plate 6 comprising holes 14. FIG. 4b is a partial side view of a plate with a hole 14. Preferably, as depicted in FIGS. 4a and 4b, the diameter of the holes is larger at one face of the partition of plate than at the other face.

The dividing line between mostly viscous deformation of a fluid and more elastic deformation is generally taken at a Deborah Number of 1. At this point even low molecular weight viscoelastic material begins to stiffen and transmit stress more effectively. At a Deborah Number of 10 the response of the material is strongly elastic and the modulus of the material is less dependent on molecular weight. Accordingly, the viscoelastic material is squeezed in the mixing device at rate corresponding to a Deborah Number greater than 10. Preferably, the viscoelastic material is squeezed at a rate corresponding to a Deborah Number greater than 100. More preferably, the viscoelastic material is squeezed at a rate corresponding to a Deborah Number greater than 1000.

One skilled in the art can readily optimize the geometry, forces, and velocities needed in the mixing device to achieve a Hencky strain greater than 2 and a Deborah Number greater than 10 based on the nature of the viscoelastic material and the flow throughput required. The parallel surfaces in the mixing device squeeze the viscoelastic material through the spaces between the plates and the inner surface of the housing and the spaces between the partitions and the central shaft. If the plates or partitions contain holes, the viscoelastic material is also squeezed through the holes as well. Extensional flows are maximized by high velocities and small clearances, while forces are minimized by large clearances and low velocities. Therefore, in order to generate sufficient extensional deformation of the material, the material should be accelerated from its rest position to a high velocity through the spaces (and holes). Depending on the breakup stresses needed to cause dispersive mixing of inhomogeneous regions in the material, such accelerations may have to be carried out over relatively long times purposely resulting in high strains and at a rate that is sufficient to break apart these regions. If the spaces between the plates and the inner surface of the housing and the spaces between the partitions and the central shaft are too great, the acceleration may be too low to be effective. In part, this may be mitigated by increasing the forces on the central shaft to increase the velocity of the plates. If the spaces are too small, the force necessary to accelerate the material over plates and partitions may be too great to be practical. Although high acceleration is important, for practical reasons such acceleration should be accomplished using relatively moderate forces.

To obtain a Hencky strain greater than 2 in the present mixing process, the cross-sectional area of the space between a plate and the inner surface of the housing or between a partition and the central shaft is less than 13.5% of the cross sectional area between the central shaft and the inner surface of the housing. (If, for example, the plate contains holes, the sum of the cross-sectional area of the holes and the cross-sectional area of the space between the plate and the inner surface of the housing is less than 13.5% of the cross sectional area between the central shaft and the inner surface of the housing.) In this case, the average velocity of the material through the space (and holes) is greater than 6.4 times the velocity of the plates. This velocity calculation may be made using a standard mass balance.

Assuming that the material to be mixed is essentially incompressible, the displaced volume of the material squeezed between a plate and a neighboring partition can be made to flow over the plate (and through any holes in the plate). As an example, in the first stage of a multi-stage process, assuming no back flow out of the first mixing cell, the cross-sectional open area around the plate (and through the plate if it contains holes), $A_o$, times the average relative velocity of the material around the plate, $V_o$, is equal to the cross sectional area of the plate, $A_p$, times the velocity of the plate, $V_p$:

$$V_p \times A_p = V_o \times A_o$$

If the percent of open area, $A_o$, is less than 50% of the cross sectional area of the plate, $A_p$, then the velocity of the fluid relative to the housing itself will be greater than the velocity of the plate relative to the housing. Accordingly, in contrast to essentially all conventional rotating-type mixing processes, it is possible with the present mixing process to achieve a higher average velocity of the viscoelastic material through the spaces in the device than the velocity of the moving surfaces. In general, in rotating-type devices, the average material velocity imparted by drag flow is less than or equal to the maximum velocity of the rotating member's surface.

Preferably, the process is operated to achieve a Henky strain of 2.5, such that the cross-sectional area of the space between a plate and the inner surface of the housing or between a partition and the central shaft is less than 8.2% of the cross sectional area between the central shaft and the inner surface of the housing. More preferably, the process is operated to achieve a Hencky strain of 3, such that the cross-sectional area of the space between a plate and the inner surface of the housing or between a partition and the central shaft is less than 5% of the cross sectional area between the central shaft and the inner surface of the housing.

It is preferred that there be little or no adhesion of the material being mixed to any of the internal surfaces of the mixing device. Slip between the materials and the components of the mixing device advantageously minimizes shear flows and maximizes extensional flows in the device. This is in contrast to known rotating-type mixing devices, in which the materials being mixed must stick to the walls and other internal surfaces of the device to produce sufficient shear in order to achieve even minimal mixing. For example, one of the most efficient conventional mixing processes occurs with two roll mills. However, without adhesion of the material being mixed to the surfaces of the rollers, there would be no flow at all and thus no mixing flows.

Preferably, greater than 50% of the material is also subjected to a shear stress of at least about 35 psi during squeezing. This ensures the material will experience at least some slip along the components of the mixing device, which further increases the dispersive mixing that takes place.

Using the rheological properties of the viscoelastic material to be mixed, that is, the shear stress versus shear rate, one can predict the expected shear stress of the material at a given set of flow conditions. It is then possible to estimate under what conditions slip will occur in a given process. For example, Hatzikiriakos and Dealy (*J. Rheol.* 36 (5), July 1992, 845–884) note that there is an upper critical shear stress where full slip flow occurs with many linear polymers. High density polyethylene has such a critical stress at about 32 psi. The shear stress at the narrowest constriction of the flow, such as a hole, can be estimated by calculating the shear as $4Q/\pi R^3$ where Q is the flow rate of the viscoelastic material in units of $L^3$/second and the radius, R, is in units of L.

The components of the mixing device may be made of a variety of known materials of construction. However, such materials of construction should be chosen to withstand the temperature, forces, and pressure changes caused by the mixing of the fluids. Because the mixing device works best when there is little or no adhesion of the material to the components of the mixing device, it is preferred that the components of the mixing device be made of materials to which the material being mixed will not fully adhere.

The following examples further illustrate the invention.

EXAMPLES

Example 1

This example illustrates the improved dispersive mixing achieved according to the invention employing squeeze flow over simple extrusion.

A single stage mixing device was assembled having an internal diameter of 4 inches and a central shaft diameter of 0.5 inches. The device contained one disc-shaped plate inside the housing, and the clearance between the plate and the inner surface of the housing was 0.1 inches. The device was driven by an air cylinder at 250 psi across a cross section of about 12 $in^2$.

A high density polyethylene (HDPE) with a significant number of gels, as confirmed by a blown film process, was fed to the device. The material was processed at a temperature of about 200° C. while air was excluded from the device. The material was subjected to 12 full cycles but very little other melt processing. The device was operated at a Hencky strain of 2.3, a Deborah Number of 300, and a shear stress over the plate of about 20 psi. Film made in a ¾ inch Brabender Film Line with a 1 inch die from the resulting material improved from very rough and gel-filled to smooth and having a low level of gels. The number of large gels (>0.6 mm) were reduced by two orders of magnitude compared with film made from the starting HDPE that was only passed through the film blowing extruder.

Example 2

This example shows the improved dispersive mixing according to the invention over a conventional extruder.

A six stage, centrally fed squeeze flow mixing device was fed with a poorly dispersed bimodal HDPE product at 10 lbs/hr. The device had an internal diameter of 4.5 inches and was about 9 inches in length. The plates within the device had a clearance from the inner surface of the housing of about 0.05 inches. The device was run using hydraulic pressure from a 4 inch bore piston cylinder, Granger model number 4Z655, operating at 2000 psi with about 4 second cycles. The stroke length was about 1 inch and the maximum velocity was less than 1 inch/second. The device was operated at a Hencky strain of 3, a Deborah Number of 1000, and a shear stress of about 35. An HDPE mixed product was obtained having much fewer gels as seen in a 1 mil film produced from a 1 inch die on a ¾ inch Brabender Blown Film line. The decrease in the number of gels improved the smoothness of the film product. This indicated that under low velocity conditions the squeeze flow action improved the product.

Example 3

A two stage squeeze flow mixing device is placed between a melt pump and a pellitizer, and is driven by a 50 hp motor powering a hydraulic system with an accumulator allowing continuous pressures of greater than 2000 psi to move the central shaft. The device has an 8 inch internal diameter and has a clearance of 0.075 inches between a first plate in the first mixing cell (containing the inlet) and the inner surface of the housing. The first plate has a distribution of holes of 0.25 inch diameter. The second plate has a clearance of 0.75 inches and 12 one inch diameter holes for the purpose of minimizing pressure peaks and is located in the second mixing cell (containing the exit port). Clearance between the single partition and the 2.5 inch central shaft is about 0.2 inches. The average velocity of material being mixed over the plate is 10 times the plate velocity. The material has a residence time in the device of about 3 minutes and sees at least 20 cycles. The average velocity of the material being mixed over each plate is over 100 inches/second when the stroke of the reciprocating shaft is 1 second traveling over a distance of 10 inches. The device is operated at a Hencky strain of 2.3, a maximum shear stress of about 40 psi and a Deborah Number of 2500.

A poorly blended, bimodal polyolefin resin is pumped to the device following melting in an intensive mixer and pressurization through a gear pump. Product is obtained from the mixing device that is dispersively well mixed.

I claim:

1. A continuous, energy efficient process for dispersively mixing a viscoelastic material, which comprises:
   i) introducing the material at a substantially constant rate into a single stage mixing device comprising:
      a) a housing having an axis, an inner surface, two end walls, an inlet, and an outlet;
      b) a central shaft located parallel to or on the axis of the housing that is reciprocatively movable parallel to or along the axis of the housing, said central shaft comprising a plate extending substantially perpendicularly therefrom, wherein the plate does not touch the inner surface of the housing; and
      c) drive means operatively attached to said central shaft for moving the central shaft through the housing in a reciprocating fashion;
   ii) squeezing the material between the plate and the end walls of the housing at a Hencky strain greater than 2 and at a rate corresponding to a Deborah Number greater than 10; and
   iii) withdrawing the material from the device at a substantially constant rate.

2. The process of claim 1, wherein the plate comprises a filter.

3. The process of claim 1, wherein the plate comprises holes.

4. A continuous, energy efficient process for dispersively mixing a viscoelastic material, which comprises:
   i) introducing the material at a substantially constant rate into a multi-stage mixing device comprising:
      a) a housing having an axis, an inner surface, two end walls, an inlet, and an outlet;
      b) at least one partition attached substantially perpendicularly to the inner surface of the housing;
      c) a central shaft located parallel to or on the axis of the housing that is reciprocatively movable parallel to or along the axis of the housing, said central shaft comprising at least two plates extending substantially perpendicularly therefrom, wherein the partitions do not touch the central shaft, the plate does not touch the inner surface of the housing, and the partition and the plates are substantially parallel; and
      d) drive means operatively attached to said central shaft for moving the central shaft through the housing in a reciprocating fashion;
   ii) squeezing the material between the plate and the end walls and between the partitions and the plate at a Hencky strain greater than 2 and at a rate corresponding to a Deborah Number greater than 10; and
   iii) withdrawing the material from the device at a substantially constant rate.

5. The process of claim 4, wherein at least one plate or partition comprises a filter.

6. The process of claim 4, wherein at least one plate or partition in the mixing device comprises holes.

7. The process of claim 4, wherein the housing comprises inlets into at least two mixing cells.

8. The process of claim 1 or 4, wherein greater than 50% of the material is subjected to a shear stress greater than 35 psi during squeezing.

9. The process of claim 1 or 4, wherein the viscoelastic material is selected from the group consisting of polymers, pharmaceuticals, foodstuffs, cements, inks, paints, solutions, suspensions, pastes, blends, multiphase materials, and mixtures thereof.

10. The process of claim 9, wherein the viscoelastic material is a mixture of molten polymers.

11. The process of claim 9, wherein the viscoelastic material is a mixture of molten polymers with fillers.

* * * * *